United States Patent
Hedman et al.

(10) Patent No.: US 9,429,213 B2
(45) Date of Patent: Aug. 30, 2016

(54) MULTI-CLUTCH TRANSMISSION FOR A HEAVY DUTY VEHICLE

(75) Inventors: Anders Hedman, Marstrand (SE);
Daniel Stålberg, Eskilstuna (SE);
Christian Wargh, Eskilstuna (SE)

(73) Assignee: Volvo Lastvagnar AB, Göteborg (SE)

(*) Notice: Subject to any disclaimer, the term of this patent is extended or adjusted under 35 U.S.C. 154(b) by 254 days.

(21) Appl. No.: 14/371,150

(22) PCT Filed: Jan. 13, 2012

(86) PCT No.: PCT/EP2012/000141
§ 371 (c)(1),
(2), (4) Date: Sep. 3, 2014

(87) PCT Pub. No.: WO2013/104374
PCT Pub. Date: Jul. 18, 2013

(65) Prior Publication Data
US 2015/0020624 A1 Jan. 22, 2015

(51) Int. Cl.
*F16H 3/091* (2006.01)
*F16H 3/00* (2006.01)
*F16H 3/08* (2006.01)

(52) U.S. Cl.
CPC ............. *F16H 3/091* (2013.01); *F16H 3/006* (2013.01); *F16H 3/0915* (2013.01); *F16H 2003/0807* (2013.01); *F16H 2200/00* (2013.01); *Y10T 74/19228* (2015.01)

(58) Field of Classification Search
CPC ............. F16H 2200/0095; F16H 2200/0082; F16H 2200/0091; F16H 2200/0086; F16H 2037/049
See application file for complete search history.

(56) References Cited

U.S. PATENT DOCUMENTS

| 5,429,005 A * | 7/1995 | Fukui | F16H 3/12 74/325 |
|---|---|---|---|
| 2005/0204837 A1 | 9/2005 | Janson et al. | |
| 2008/0134834 A1* | 6/2008 | Gitt | F16H 37/046 74/745 |
| 2008/0214351 A1* | 9/2008 | Katayama | F16H 47/04 475/296 |
| 2010/0257967 A1* | 10/2010 | Rieger | F16H 3/006 74/331 |
| 2014/0305239 A1* | 10/2014 | Lubke | F16H 37/046 74/331 |

FOREIGN PATENT DOCUMENTS

| DE | 103 39 758 A1 | 6/2005 |
|---|---|---|
| DE | 10 2009 014358 A1 | 9/2010 |
| WO | 2011123019 A1 | 10/2011 |

OTHER PUBLICATIONS

International Search Report (Mar. 16, 2013) for corresponding International App. PCT/EP2012/000141.
International Preliminary Report on Patentability (Dec. 20, 2013) for corresponding International App. PCT/EP2012/000141.

* cited by examiner

*Primary Examiner* — William Kelleher
*Assistant Examiner* — Gregory Prather
(74) *Attorney, Agent, or Firm* — WRB-IP LLP

(57) ABSTRACT

A multi-clutch transmission is provided with a first and a second input frictional clutch, an input arrangement for establishing a driving connection of a prime mover and the first and second frictional clutches, and a main transmission. The main transmission has a first and a second rotational axis about which a main shaft and a countershaft is arranged respectively, an output shaft and connection means for establishing a driving connection between the main shaft and the output shaft, and least two input shafts, which are connected to the first and second input frictional clutch, and a reverse shaft provided with a first reverse gear wheel. A reverse gear is achieved by transferring power over the reverse shaft to the output shaft.

7 Claims, 2 Drawing Sheets

MULTI-CLUTCH TRANSMISSION FOR A HEAVY DUTY VEHICLE

BACKGROUND AND SUMMARY

The present invention relates to vehicle transmissions, especially for heavy, on- and off-road vehicles, and more particularly to dual- and multi-clutch transmissions with a reversing unit that produces several reverse ratios.

Dual clutch transmissions are a cross-breed between conventional stepped transmissions with power interruption at gear shifts and planetary power shifting transmissions, with continuous power transfer through the transmission. In principle, a dual clutch transmission has two input shafts, each connectable to a friction clutch and to the output of the engine. Functionally, this is equivalent to having two conventional transmissions in parallel, i.e., two parallel sub-transmissions, and using one at a time for power transfer. The sub-transmission that is not used, idling, for the irr being, can have a gear engaged and prepared for a subsequent shift. This shift is carried out by simultaneously disengaging the friction clutch of the previously used sub-transmission and engaging the friction clutch of the previously idling sub-transmission.

When properly designed, dual clutch transmissions have the potential of providing power shifts at a reasonable production cost and low power losses. This is due to the fact that the rotating parts, i.e., gearwheels, shafts and tooth clutches, are similar to those in conventional stepped transmissions. This, furthermore, enables the use of the same production equipment.

Some dual clutch transmissions have two separate countershafts, one connected to each input shaft. One example is found in U.S. Pat. No. 5,150,628. The double countershafts make the transmission considerably wider than a conventional stepped transmission. That may lead to difficulties in installing the transmission into the vehicle.

Other dual clutch transmissions are designed such that there is only one countershaft, e.g., as in DE923402 and DE3131156A1. On this countershaft there are loose gearwheels arranged that can be rotationally connected to each other and to the countershaft by means of mechanical tooth clutches. The result is a very compact dual clutch transmission, which enables power shifting and that is not wider than a corresponding conventional stepped transmission. In these transmissions, there are only two reverse gears though, which is insufficient for heavy severe-duty on- and off road vehicles, such as wheel loaders and articulated haulers. These vehicles require a handful of reverse gears in order to produce both very high tractive force at low vehicle speeds and being able to drive at relatively high speed.

Dual-clutch transmission concepts in a so-called winding structure have been presented, e.g. in DE10339758A1. Therein, the power is led via four gear meshes in at least one gear, and several gearwheels are used for more than one gear. However, this will give just one or two additional reverse gears. Such concepts are hence less suited to heavy on- and off road vehicles.

U.S. Pat. No. 6,958,028B2 shows dual clutch transmission concepts with a special power path for reverse gears between the main transmission and range section. This will result in several selectable reverse gears with appropriate speed ratio steps in between. Typically, the number of reverse gears is half that of forward gears, e.g., four reverse gears and eight forward gears. This is probably sufficient for heavy on- and off road vehicles. However, these designs are bulky and expensive, having two parallel countershafts and a large number of gearwheels.

Hence, there is thus a need for an improved dual-clutch transmission removing the above mentioned disadvantages.

It is desirable to provide a dual-clutch transmission, for heavy duty on- and off road vehicles, which enables high power transfer to the driven wheels during all shifts between consecutive gears, can provide reverse gears for high tractive force to high vehicle speed, is cost-effective and simple to produce, has low power losses and can be easily installed in a vehicle.

According to an aspect of the invention, a multi-clutch transmission, for a heavy duty motor vehicle with at least one prime mover, such as wheel loaders and/or articulated haulers is provided with a first and a second input frictional clutch, input means for establishing a driving connection of said prime mover and said first and second frictional clutches, and a main transmission. By engaging said first input frictional clutch is a first input shaft driven and by engaging said second input frictional clutch is a second input shaft driven.

Said main transmission having a first and a second rotational axis about which a main shaft and a countershaft is arranged respectively, an output shaft and connection means for establishing a driving connection between said main shaft and said output shaft, and at least two input shafts, which are connected to said first and second input frictional clutch, and a reverse shaft provided with a first reverse gear wheel. A reverse gear is achieved by transferring power over the reverse shaft to said output shaft.

Said first and second input frictional clutch is in conventional manner adapted to be in driving connection with said main shaft and said countershaft respectively. Said main transmission is provided with at least four forward speed ratios, between which sequential power shifts can be carried out.

Two of said forward speed ratios thereby transfers power through the first input frictional clutch, and two transfer power through the second input frictional clutch. Normally, the number of forward speed ratios is increased in pairs (one forwards speed ratios per input clutch), wherein the inventive transmission also is suitable for another number of forward speed ratios. An uneven number of forward speed ratios is also imaginable, however not preferred.

As known in the art, a multi-clutch transmission comprises a plurality of gear wheels and clutches arranged upon the main shaft and the countershaft. The different gears of the multi-clutch transmission are thereby achieved in conventional manner, through selective engagement of said clutches.

The inventive multi-clutch transmission is characterised in that it is provided with one gear wheel in said main transmission, which one gear wheel transfers power in all reverse speed ratios and in at least two forward speed ratios, such that shifts between at least four sequential reverse speed ratios can be carried out with a continuous power transfer between said input means and said output shaft.

The inventive multi-clutch transmission thereby provides a plurality of continuous shiftable reverse speed ratios, in the same time as the transmission is compact, due to that the one gear wheel is used in all reverse speed ratios and in at least two forward speed ratios. In the inventive multi-clutch transmission it is possible to have the same number of reverse gears as forward gears, and wherein power shifting between consecutive forward and reverse gears is possible. Because the reverse speeds are provided with a corresponding ratio difference between the speed ratios, the transmission provides reverse gears for high tractive force as well as for high vehicle speeds. The transmission further enables a high power transfer to the driven wheels during all shifts between consecutive gears in both forward and reverse. The transmission is further cost-effective and simple to produce due to its simple construction with only one main shaft, one countershaft, one reverse shaft, and the one gear wheel transferring power in at least two forward gears and all reverse gears. Further due to this inventive design, the transmission can be fitted and easily installed in the limited space available in the vehicles.

The reverse shaft is provided and arranged about a third rotational axis, which is parallel and adjacent to said main first and second rotational axis. Said reverse gear wheel is arranged upon said reverse shaft such that it meshes with said one gear wheel.

Said one gear wheel is preferably arranged upon said counter shaft and is meshing with a gear wheel upon said main shaft and said first reverse gear wheel upon said reverse shaft.

Said one gear wheel is further a loose gear wheel and rotatable arranged upon said countershaft.

A second loose gear wheel is provided upon the countershaft and wherein said one gear wheel and said second loose gear wheel can be engaged with each other through a first gear wheel clutch, such that said second loose gear wheel and said one gear wheel is rotationally fixed to each other. In an engaged state the one gear wheel and the second loose gear wheel acts as a shaft coaxial arranged to the countershaft and which can be rotated independently from the countershaft.

Said reverse shaft is provided with a second reverse gear wheel, which is able to transfer power to a third reverse gear wheel upon said output shaft of said main transmission. By transferring power to said output shaft over said first and second reverse gear wheel upon the reverse shaft, the direction of rotation of the output shaft is opposite to the direction of rotation of the input means of the transmission.

In a preferred embodiment of the inventive multi-clutch transmission, said one gear wheel transfers power in only one gear plane perpendicular to said first and second axis in all reverse speed ratios and in the at least two forward gear ratios. The inventive multi-clutch transmission is thereby held compact.

It is also preferred that the one gear wheel is rotatably arranged upon said countershaft. With this configuration the number of on bearings arranged gear wheels are minimised.

The main shaft of the inventive transmission is preferably suspended in a pilot bearing upon said output shaft.

In order to achieve the double number of gears, it is possible to provide the inventive transmission with a range section. The output shaft is thereby connected to a range section where at least two alternating torque paths having different speed ratios can be established by selective engagement and disengagement of at least one clutch.

The inventive transmission enables plurality of reverse speed ratios in a compact multi-clutch transmission.

BRIEF DESCRIPTION OF THE DRAWINGS

The present invention will now be described in detail with reference to the figures, wherein.

DETAILED DESCRIPTION

In the following only one embodiment of the invention is shown and described, simply by way of illustration of one mode of carrying out the invention. The drawings are purely schematic, wherein any dimensions of gears cannot be withdrawn from the drawings.

Figure 1:
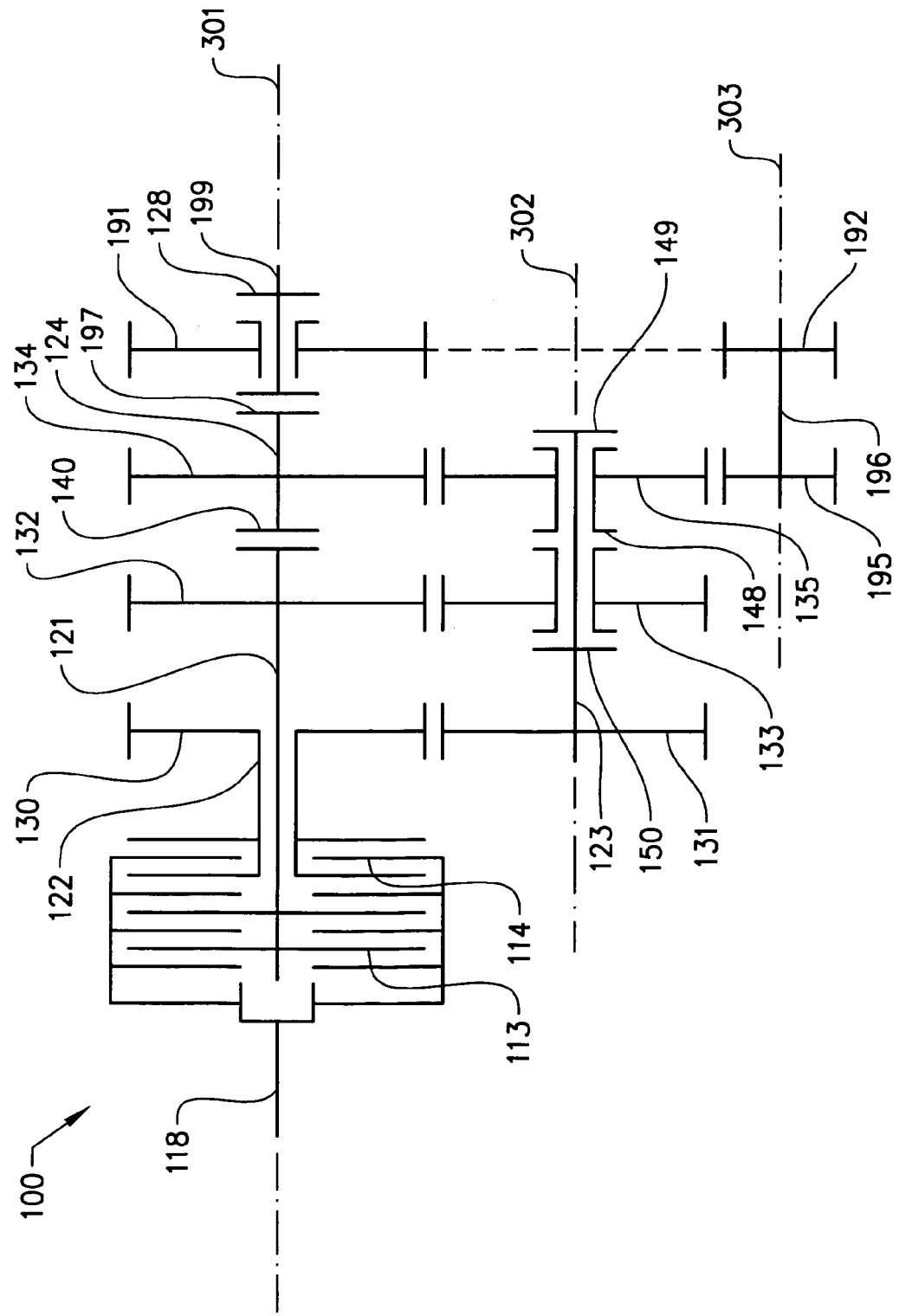
FIG. 1 shows a schematic drawing of a four forward, four reverse speed ratio multi-clutch transmission according to the invention.

FIG. 1 shows a four forward and four reverse speed ratio multi-clutch transmission 100 according to the invention. The function of the transmission 100, will now be described.

The multi-clutch transmission 100 comprises a first and a second input frictional clutch 113, 114, both in driving connection with a transmission input means 118. There are two input shafts; a first input shaft 121 and a second input shaft 122. The first input shaft 121 can be rotationally driven by the input means 118 when the first input clutch 113 is engaged. Similarly, the second input shaft 122 can be rotationally driven by the input means when the second input clutch 114 is engaged.

A first primary gear teeth 132 are integral with the first input shaft 121 and a second primary gear teeth 130 are integral with the second input shaft 122. A main shaft 124 is coaxial with the input shafts 121 and 122 and a countershaft 123 is parallel thereto.

A first secondary gearwheel 134 is provided on the main shaft 124 and is fixedly arranged thereon. On the countershaft 123 a first primary gear wheel 133 is provided, as a loose gearwheel. The first primary gear wheel 133 meshes with the first primary gear teeth 132 of the first input shaft 121. A second primary gearwheel 131 is rotationally fixed upon the countershaft 123 and meshes with the second primary gear teeth 130 of the second input shaft 122.

A second secondary gearwheel 135 is provided on the countershafts 123, which second secondary gearwheel 135 is a loose gearwheel and meshes with the first secondary gearwheel 134, which is fixedly arranged on the main shaft 124.

A reversing function has been achieved in the multi-clutch transmission 100 in an inventive manner. Firstly is an output shaft 199 is arranged coaxial with the main shaft 124, wherein the output shaft 199 and the main shaft 124 can be connected through a forward clutch 197. A reverse shaft 196 is arranged parallel in triangular form to the main shaft 124 and countershaft 123. In the figures, the reverse shaft 196 is shown beneath the main shaft 124 and the countershaft 123 for illustrative reasons. Two gearwheels are rotationally fixed with the reverse shaft 196. Firstly, a first reverse gearwheel 195 meshes with the first secondary gearwheel 135 on the countershaft 123. Secondly, a second reverse gearwheel 192 meshes with a third reverse gearwheel 101 that is arranged on the output shaft 199, wherein the third reverse gearwheel 191 is a loose gearwheel that can be set in driving connection with the output shaft 199 through the reverse clutch 128.

In an alternative embodiment (not shown) the third reverse gearwheel 191 is fixedly arranged upon the output shaft, the second reverse gear wheel 192 is freely rotatable arranged upon the reverse shaft 196, and the reverse clutch 128 is arranged upon the reverse shaft 196 in order to rotationally fix the second reverse gear wheel 192 to the reverse shaft 196.

The main shaft 124 is coaxial to the first and the second input shaft 121, 122 and centred about a first rotational axis 301. The countershaft 123 is centred about a second rotational axis 302, and the reverse shaft 196 is centred about a third rotational axis 303. The first, the second and the third rotational axis 301, 302, 303 are parallel to each other.

The forward clutch 197 can selectively rotationally lock the main transmission output shaft 199 to the main shaft 124. The reverse clutch 128 can selectively rotationally lock the main transmission output shaft 199 to the third reverse gearwheel 191, which is arranged as a loose gear wheel upon the output shaft 199.

When power is transferred through the transmission 100, the first secondary gearwheel 135 will have the opposite sense of rotation as the main shaft 124. The reverse shaft 196 will then rotate in the same sense as the main shaft 124, and the third reverse gearwheel 191 in the opposite sense. Thus, by rotationally locking the main transmission output shaft 199 to the reverse loose gearwheel 191, the output shaft 199 will have the opposite sense of rotation compared to the main shaft 124, i.e. the direction of rotation has changed between the input means 118 and the output shaft 199.

In a first forward gear, the first input clutch 113 is engaged, rotationally locking the input means 118 to the first input shaft 121 and the first gear wheel clutch 148 is engaged, rotationally locking the first primary gearwheel 133 to the second secondary gearwheel 135. Power is led from the first input shaft 121 via first primary gear teeth 132, the first primary gearwheel 133, the second secondary gearwheel 135 and the first secondary gearwheel 134 to the main shaft 124, and further to the output shaft 199 over the closed forward clutch 197. In reverse, power is diverted from the second secondary gearwheel 135 to the first reverse gearwheel 195 and there from to the first reverse gearwheel 195, the reverse shaft 196, the second reverse gear wheel 192 and on to the third reverse gearwheel 191 on the output shaft 199, whereby the forward clutch 197 thereby is disengaged and the verse clutch 128 is engaged.

In a second forward gear the second input clutch 114 is engaged, rotationally locking the input means 118 to the second input shaft 122 and the second gear wheel clutch 149 is engaged, rotationally locking the first secondary gearwheel 135 to the counter shaft 123. Power is led from the second input shaft 122 via second primary gear teeth 130, the second primary gearwheel 131, the countershaft 123, second secondary gearwheel 135 and the first secondary gearwheel 134 to the main shaft 124 and further to the output shaft 199 over the closed forward clutch 197. In reverse, power is diverted from the second secondary gearwheel 135 to the first reverse gearwheel 195, the reverse shaft 196, the second reverse gear wheel 192 and on to the third reverse gearwheel 191 on the output shaft 199, whereby the forward clutch 197 thereby is disengaged and the reverse clutch 128 is engaged.

The difference in speed ratio between the first and second forward/reverse speed ratios corresponds to the difference in gear ratio between the gear steps: first primary gear teeth 132 to first primary gear wheel 133 and second primary gear teeth 130 to second primary gear wheel 131.

In a third forward gear the first input clutch 113 is engaged, rotationally locking the input means 118 to the first input shaft 121 and the direct clutch 140 is engaged, rotationally locking the first input shaft 121 to the main shaft 197. Power is thereby led from the first input shaft 121 directly to the main shaft 124 and further to the output shaft 199 over the closed forward clutch 197. The speed ratio is thereby 1:1. In reverse, power is diverted from main shaft 124 by the first secondary gearwheel 134 to the second secondary gear wheel 135 and there from to the first reverse gearwheel 195, the reverse shaft 196, the second reverse gear wheel 192 and on to the third reverse gearwheel 191 on the output shaft 199, whereby the forward clutch 197 thereby is disengaged and the reverse clutch 128 is engaged.

In a forth forward gear the second input clutch 14 is engaged, rotationally locking the input means 118 to the second input shaft 122 and the third gear wheel clutch 150 is engaged, rotationally locking the first primary gear wheel 133 to the countershaft 123, wherein also the direct clutch 140 is engaged rotationally locking the first input shaft 121 to the main shaft 197. Power is thereby led from the second input shaft 122 via second primary gear teeth 130, the second primary gearwheel 131, the countershaft 123, the first primary gear wheel 133, the first primary gear teeth 132 on the first input shaft 121, over the direct clutch 140 on to the main shaft 124 and over the closed forward clutch 197 to the output shaft 199. In reverse, power is diverted from main shaft 124 by the first secondary gearwheel 134 to the second secondary gear wheel 135 and there from to the first reverse gearwheel 195, the reverse shaft 196, the second reverse gear wheel 192 and on to the third reverse gearwheel 191 on the output shaft 199, whereby the forward clutch 197 thereby is disengaged and the reverse clutch 128 is engaged.

The clutches are opened if nothing else is mentioned for a specific gear. Further, the forward clutch 197 is always engaged in the forward gears in order to transfer power from the main shaft 124 to the output shaft 199, whereby the reverse clutch 128 is disengaged, in order to separate the third reverse gear wheel 191 and the output shaft 199, which is rotating in opposite directions. And the reverse clutch 128 is always engaged in the reverse gears in order to transfer power from the reverse shaft 196 to the output shaft 199, whereby the forward clutch 197 is disengaged in order to separate the main shaft 124 and output shaft 199, which is rotating in separate directions.

The described transmission 100 is provided with four forward speed ratios and four reverse speed ratios. The second secondary gear wheel 135 arranged as a loose gear wheel upon the countershaft 123 transmits, according to the invention, power in two of the forward speed ratios (above described as the first and the second gear) and in all the reverse gears.

Due to the inventive design with the second secondary gear wheel 135 transmitting power in two forward speed ratios and all the reverse speed ratios, only three additional gear wheels 195, 192, 191 is needed, in order to establish the same number of reverse speed ratios as forward speed ratios, wherein the transmission becomes very compact.

Figure 2:
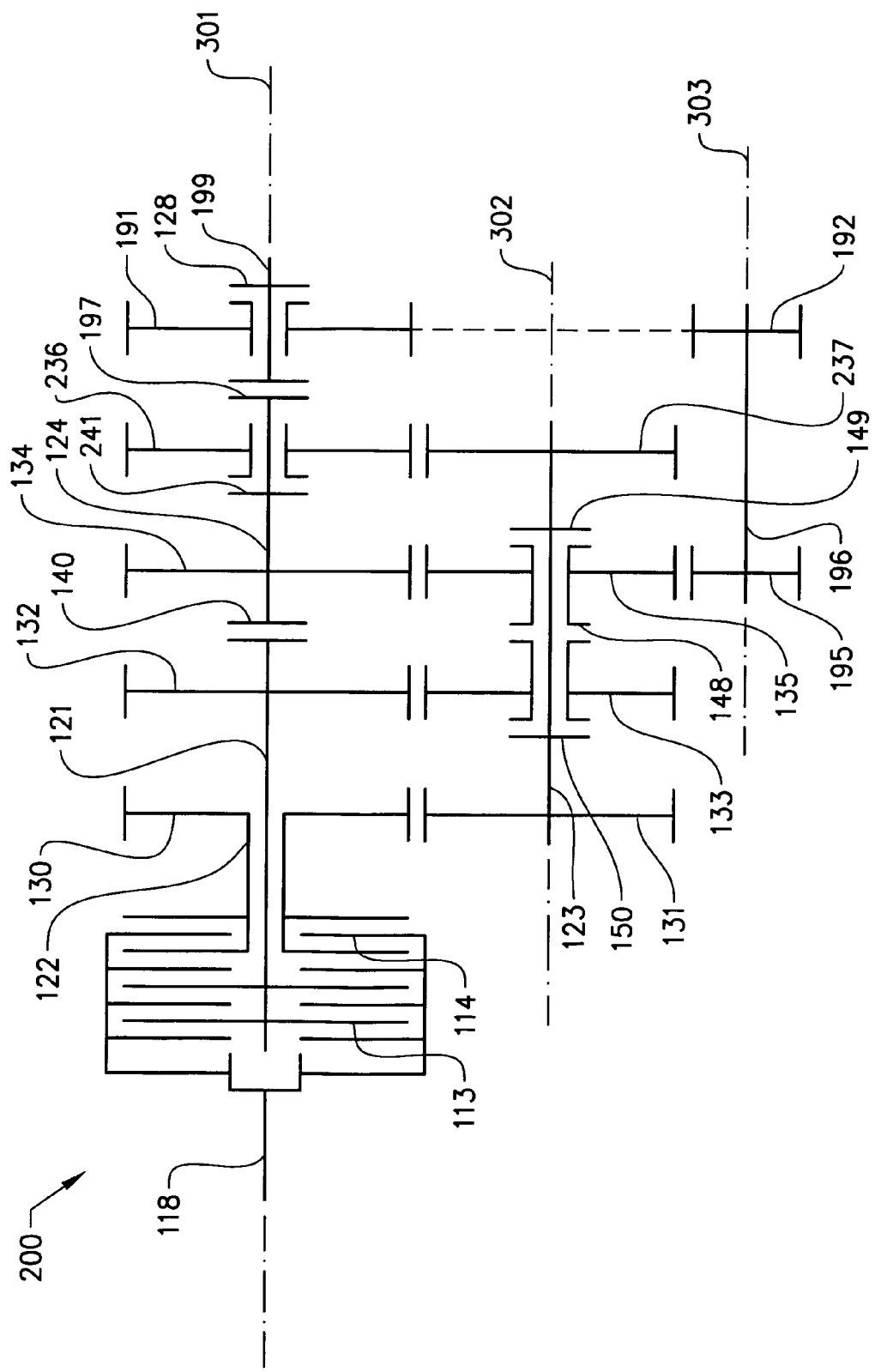
FIG. 2 shows a schematic drawing of a six forward, six reverse speed ratio multi-clutch transmission according to the invention.

FIG. 2 discloses another embodiment of a transmission 200 according to the invention. The transmission 200 is provided with an additional gear step comprising a third secondary gear wheel 236 arranged as a loose gear wheel upon the main shaft 124, a fourth gear wheel clutch 241 arranged to engage the third secondary gear wheel 236 with the main shaft 124 and a fourth secondary gear wheel 137 fixedly arranged upon the countershaft 123.

The four forward and four reverse speed ratios described for the embodiment of the transmission 100 in FIG. 1, are the same in the embodiment shown in FIG. 2. However a fifth and a sixth forward and a fifth and a sixth reverse speed ratio is also provided.

In a fifth forward gear the first input clutch 113 is engaged, rotationally locking the input means 118 to the first input shaft 121 and the third gear wheel clutch 150 and the fourth gear wheel clutch 241 is engaged, rotationally locking the first primary gearwheel 133 to the countershaft 123 and the third secondary gear wheel 236 to the main shaft 124. Power is led from the first input shaft 121 via first primary gear teeth 132, the first primary gearwheel 133, the counter shaft 123, the fourth secondary gearwheel 237 and the third secondary gearwheel 236 to the main shaft 124, and further to the output shaft 199 over the closed forward clutch 197. In reverse, power is diverted from the main shaft 124 and the first secondary gear wheel 134 to the second secondary gearwheel 135 to the first reverse gearwheel 195 and on to the third reverse gearwheel 391 on the output shaft 199, whereby the forward clutch 197 thereby is disengaged and the reverse clutch 138 thereby is engaged.

In a sixth forward gear the second input clutch 114 is engaged, rotationally locking the input means 118 to the second input shaft 122 and the fourth gearwheel clutch 124 is engaged rotationally locking the third secondary gear wheel 236 to the main shaft 124. The power is led from the second input shaft 122 via second primary gear teeth 130 and the second primary gear wheel 131 on to the countershaft 123. The second and third gear clutches 149, 150 between the second secondary gear wheel 135 and the countershaft 123 and between the first primary gear wheel 133 and the countershaft 123 respectively are both disengaged. The power is thereby led from the countershaft 123 over the fourth secondary gearwheel 237 and the third secondary gearwheel 236 to the main shaft 124 and further to the output shaft 199 over the closed forward clutch 197. In reverse, power is diverted from the main shaft 124 and the first secondary gear wheel 134 to the second secondary gearwheel 135 to the first reverse gearwheel 195 and on to the third reverse gearwheel 391 on the output shaft 199, whereby the forward clutch 197 thereby is disengaged and the reverse clutch 138 thereby is engaged.

The transmission 200 shown in FIG. 2 is due to the inventive design with the second secondary gear wheel 135 transmitting power in two forward speed ratios and all six reverse speed ratios, becomes compact because only three additional reverse gear wheels 195, 192, 191 is needed in order to achieve the six reverse speed ratios, i.e. same amount of reverse gear wheels needed to achieve the four reverse speed ratios in the transmission 100 shown in FIG. 1.

As will be realised, the invention is capable of modification in various obvious respects, all without departing from the scope of the appended claims. A transmission 100, 200 according to the invention can be constructed in various ways, without departing from the scope of the appended claims, e.g. different kinds of clutches and gear wheel types can be used, such as different kinds of tooth and frictional clutches. Accordingly, the drawings and the description thereto are to be regarded as illustrative in nature, and not restrictive.

Reference signs mentioned in the claims should not be seen as limiting the extent of the matter protected by the claims, and their sole function is to make claims easier to understand.

The invention claimed is:

1. Multi-clutch transmission for a heavy duty motor vehicle with at least one prime mover, such as wheel loaders and/or articulated haulers, the multi-clutch transmission is provided with;
   a first and a second input frictional clutch,
   input means for a driving connection of the prime mover and the first and second frictional clutches,
   a main transmission having
   a first and a second rotational axis about which a main shaft and a countershaft are arranged respectively,
   an output shaft, and connection means for establishing a driving connection between the main shaft and the output shaft, and
   at least two input shafts that are connected to the first and second input frictional clutch,
   a reverse shaft provided with a first reverse gear wheel, the first and second input frictional clutch is adapted to be in driving connection with the main shaft and the countershaft respectively, wherein the main transmission is provided with at least four forward speed ratios, between which sequential power shifts can be carried out, wherein the reverse shaft is parallel and adjacent to the main shaft and the countershaft, and wherein the first reverse gear wheel is arranged upon the reverse shaft, wherein one gear wheel in the main transmission is arranged upon the counter shaft and is meshing with a first secondary gear wheel upon the main shaft and the first reverse gear wheel upon the reverse shaft, and wherein the reverse shaft is provided with a second reverse gear wheel, which is able to transfer power to a third reverse gear wheel upon the output shaft, wherein a second loose gear wheel is provided upon the countershaft, and wherein the one gear wheel and the second loose gear wheel can be engaged with each other through a first gear wheel clutch, such that the second loose gear wheel and the one gear wheel is rotationally fixed to each other, and such that the one gear wheel transfers power in all reverse speed ratios and in at least two forward speed ratios, and such that shifts between at least four sequential reverse speed ratios can be carried out with a continuous power transfer between the input means and the output shaft.

2. Multi-clutch transmission according to claim 1, wherein the one gear wheel is a loose gear wheel and rotatable arranged upon the countershaft.

3. Multi-clutch transmission according to claim 1, wherein the one gear wheel transfers power in only one gear plane perpendicular to the first and second axis in all reverse speed ratios and in the at least two forward gear ratios.

4. Multi-clutch transmission according to claim 1, wherein the second reverse gear wheel is arranged rotationally fixed upon the reverse shaft, whereby the third reverse gear wheel is a loose gear wheel and rotatable arranged upon the output shaft, and wherein a reverse clutch is provided and which can engage the third reverse gear wheel to the output shaft.

5. Multi-clutch transmission according to claim 1, wherein the second reverse gear wheel is a loose gear wheel and rotatably arranged upon the reverse shaft, whereby the third reverse gear wheel is arranged rotationally fixed upon the output shaft, and wherein a reverse clutch is provided and which can engage the second reverse gear wheel to the reverse shaft.

6. Multi-clutch transmission according to claim 1, wherein the main shaft is rotatably suspended in the output shaft.

7. Multi-clutch transmission according to claim 1, wherein the output shaft is connected to a range section were least two alternating torque paths having different speed ratios can be established by selective engagement and disengagement of at least one clutch.

* * * * *